(12) United States Patent
Treger et al.

(10) Patent No.: US 7,124,566 B2
(45) Date of Patent: Oct. 24, 2006

(54) CUTTING DEVICE, PARTICULARLY A LAWN MOWER

(75) Inventors: Claude Treger, Hunspach (FR); Daniel Bour, Enchenberg (FR)

(73) Assignee: Outils Wolf, Wissembourg Cedex (FR)

( * ) Notice: Subject to any disclaimer, the term of this patent is extended or adjusted under 35 U.S.C. 154(b) by 0 days.

(21) Appl. No.: 11/070,565

(22) Filed: Mar. 2, 2005

(65) Prior Publication Data

US 2005/0193708 A1 Sep. 8, 2005

(30) Foreign Application Priority Data

Mar. 5, 2004 (EP) .................................. 04005226

(51) Int. Cl.
*A01D 63/00* (2006.01)
(52) U.S. Cl. ........................................ 56/295; 56/255
(58) Field of Classification Search ................ 56/295, 56/255, 17.5, 12.7, DIG. 17
See application file for complete search history.

(56) References Cited

U.S. PATENT DOCUMENTS

| | | | |
|---|---|---|---|
| 2,749,909 A | 6/1956 | Ullery et al. | |
| 3,252,304 A * | 5/1966 | Moody | 464/36 |
| 3,610,304 A | 10/1971 | Popeil | |
| 3,670,413 A * | 6/1972 | Weber | 30/276 |
| 3,877,146 A * | 4/1975 | Pittinger | 30/276 |
| 4,070,941 A | 1/1978 | Lorenz | |
| 4,586,257 A * | 5/1986 | Rittenhouse | 30/276 |
| 4,712,364 A * | 12/1987 | Oxley | 56/295 |
| 5,136,782 A * | 8/1992 | Calcinai | 30/276 |
| 5,447,086 A | 9/1995 | Witmaier et al. | |
| 6,205,755 B1 * | 3/2001 | Bontrager et al. | 56/17.5 |

FOREIGN PATENT DOCUMENTS

DE          195 20 618 A1          12/1995

* cited by examiner

*Primary Examiner*—Meredith C. Petravick
(74) *Attorney, Agent, or Firm*—Akin Gump Strauss Hauer & Feld, LLP

(57) ABSTRACT

A cutting device, particularly a lawn mower, has at least one rotating knife mounted on a rotating, motor-driven knife carrier by a screwless, detachable connection. This connection is detachable by a relative rotation between the knife and the knife carrier. It is essential that the connection between the knife and its knife carrier be made by a centrally arranged bayonet lock and that this bayonet lock be locked in the closed position by an additional locking element.

7 Claims, 7 Drawing Sheets

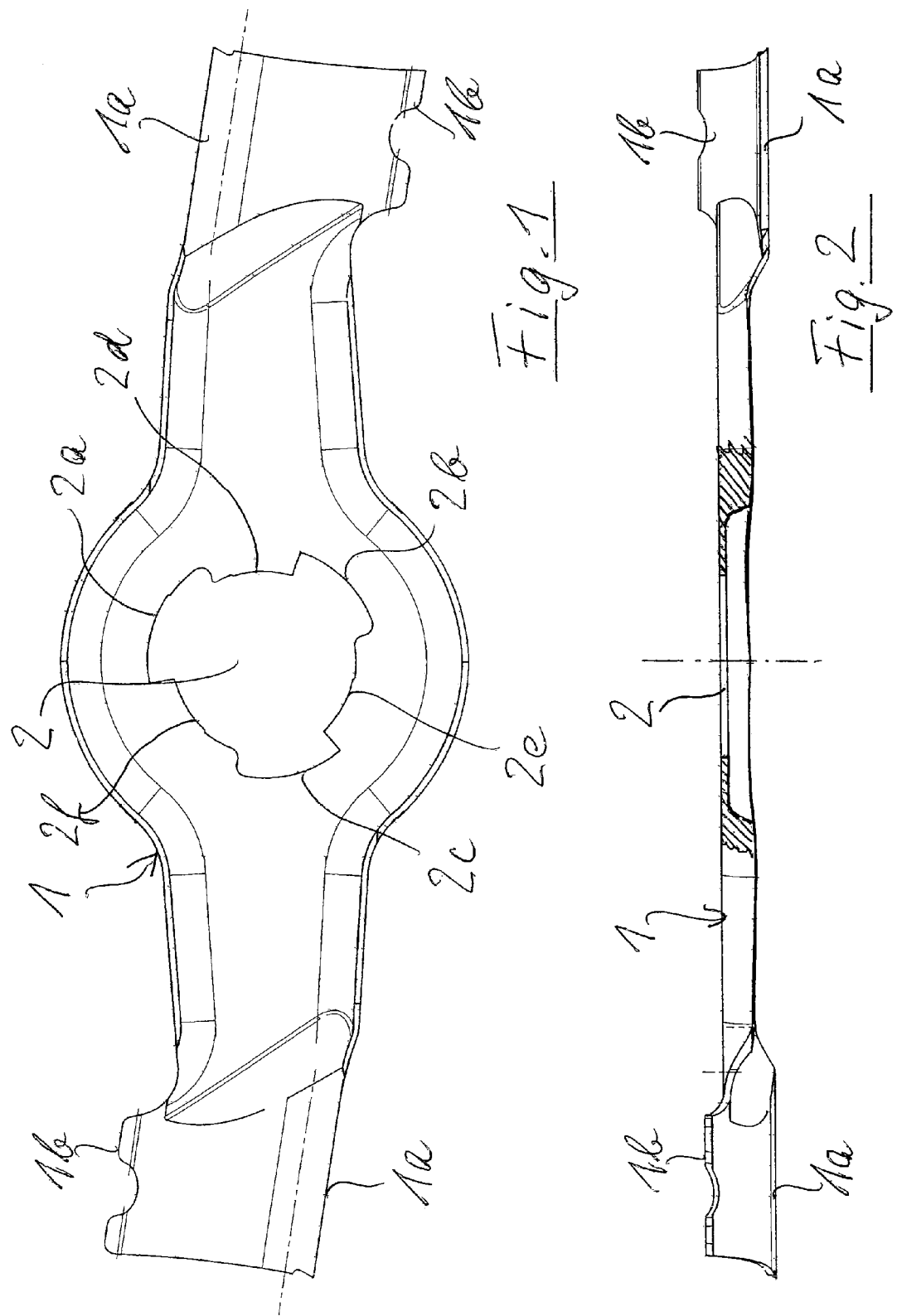

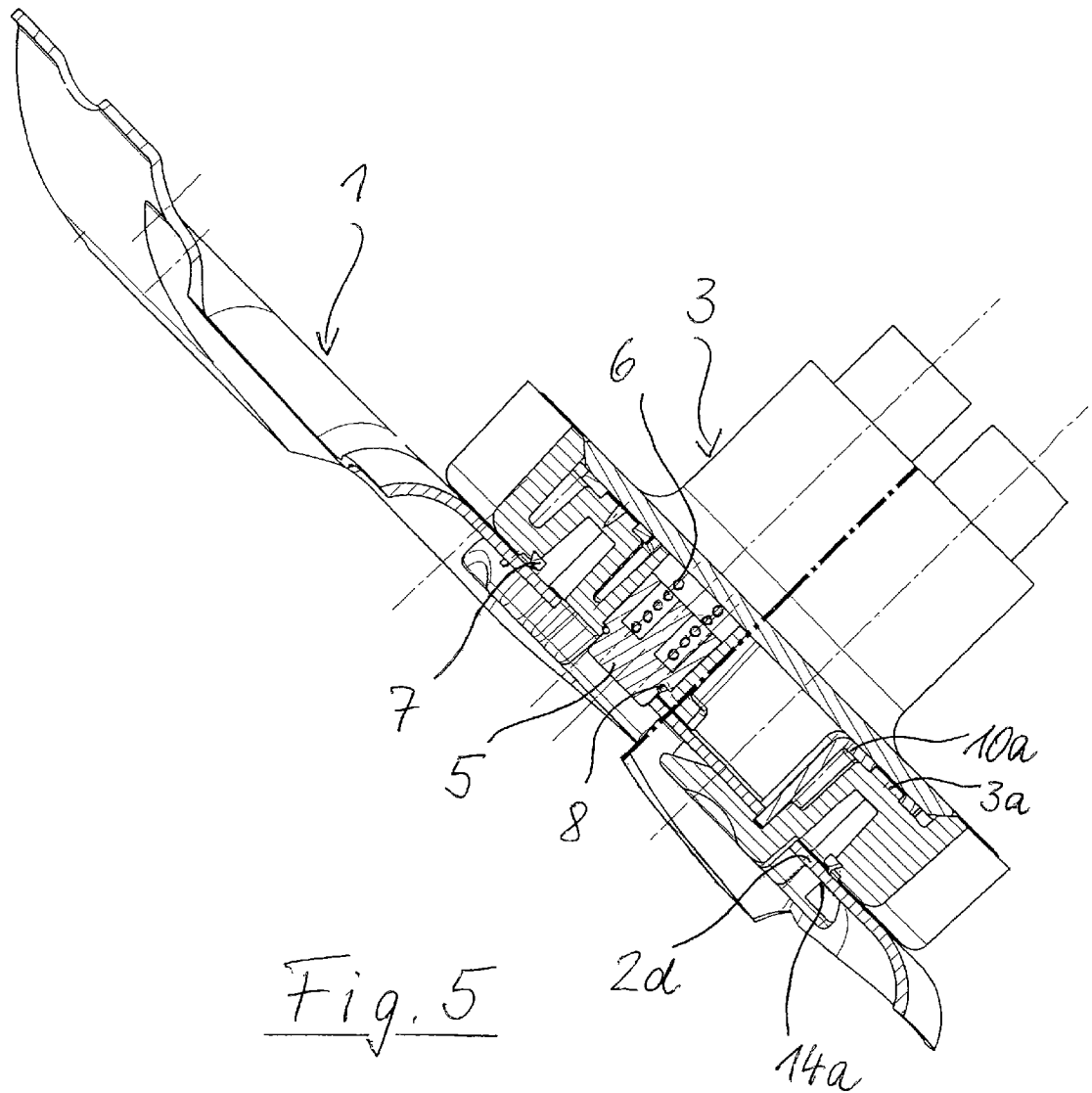

CUTTING DEVICE, PARTICULARLY A LAWN MOWER

BACKGROUND OF THE INVENTION

The invention relates to a cutting device, in particular, a lawn mower having at least one rotating knife, which is mounted on a rotating, motor-driven knife carrier by a screwless, detachable connection, the connection being detachable by a relative rotation between the knife and the knife carrier.

In lawn mowers it is necessary to regrind the knives from time to time to ensure a smooth, clean cut of the grass. When the knives are mounted, this regrinding is only possible temporarily. Usually, the knives are removed and clamped in a special grinding device to maintain the correct cutting angle over the length of the knife.

After a longer period of use, conventional screw connections for the knife are clogged with cut material and soil, so that it becomes more difficult to detach the knife. Thus, a screwless knife carrier is already known from German patent DE 195 20 618, having the features described at the outset, in which the knives can be exchanged without the use of tools.

This known knife holder comprises a motor-driven disk, which supports two downwardly protruding pins, a knife being placed on each of their projecting ends, so that each knife is swivel-mounted on its respective pin. Below the knives a rotatable plate is located, which has grooves each extending in a peripheral direction in the area of the pins, so that the plate can be turned relative to the disk with the pins and the knives. The plate thereby accommodates the ends of the pins in their respective grooves and supports the knives from the bottom in a screwed-in position. To secure the plate in its screwed in position holding the knives, each groove terminates in a recess in which the associated pin engages. This locking connection hinders the plate from turning back. However, it cannot preclude this turning back when the plate is loaded by random outer influences in a direction of release.

Moreover, the rotatable plate requires a support from the bottom. This support is provided by a cap arranged underneath. This cap covers the rotatable plate and, as a result, makes accessibility of the plate more difficult when the knives are to be removed.

BRIEF SUMMARY OF THE INVENTION

Proceeding from this background, an object of the present invention is to provide a connection between the knife and the knife carrier, which can also be detached without tools, but which is easier to handle and, at the same time, more reliable than in the known case. Not least, the connection according to the invention should be distinguished by cost-efficient manufacturing.

According to the invention, this object is solved in that the connection between the at least one knife and its knife carrier is made by a centrally arranged bayonet lock and that this bayonet lock can be stopped by at least one additional locking element in the closed position.

Thus, according to the invention, the detachable connections, which are required on each knife in the prior art device, are replaced by a single common bayonet lock. At the same time, an additional locking element is provided which holds the bayonet lock in the closed position.

Thus, the knife holder of the invention operates with considerably fewer parts than previously, and replacement of the knives becomes easier and quicker, because the accessibility of the bayonet lock is not affected by a lower cover.

In addition, the locking element increases reliability, because it produces a real positive locking, whereas there is only a stop or snap connection in the prior art device.

Preferably, the locking element has two positions such that, in one position, the relative turning between the knife and the knife carrier is blocked but, in the other position, the relative turning is released. There are various possibilities available to a skilled person for the structural design of the locking element. However, it was shown to be especially advantageous to design the locking element as a spring-mounted push button, which is held in the locked position by spring tension and only releases the relative rotation when it is pressed against the spring tension.

Theoretically, the locking element could be mounted on the knife itself. However, structurally, it is much more advantageous to mount the locking element together with its spring in the knife carrier.

Another beneficial embodiment of the invention is to select the relative rotation between the knife and the knife bar such that the knife is only released when the knife is turned in the direction of cutting. As a result, impacts which result when the knife strikes obstacles do not have an effect such that the bayonet lock opens, and the locking element is also not loaded by these impacts.

The knife itself is preferably formed by a continuous knife bar, which is sharpened at two opposite outer edges and interacts at its center with the bayonet lock. In particular, the knife bar has a central opening with radial recesses, and at least one of these recesses interacts with the locking element.

To ensure that the bayonet lock retains its efficiency, in particular its free movement, it is recommended that the locking element have a seal against the knife and/or the knife carrier in the vicinity of its end used for operation. This prevents cut material and soil from penetrating. A seal can also be placed between the knife carrier and the knife for the same purpose.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1 is an axial bottom view of the knife according to the invention;

FIG. 2 is side view of the knife of FIG. 1;

FIG. 5 is a sectional view along line V—V in FIG. 4;

DETAILED DESCRIPTION OF THE INVENTION

Figure 3:
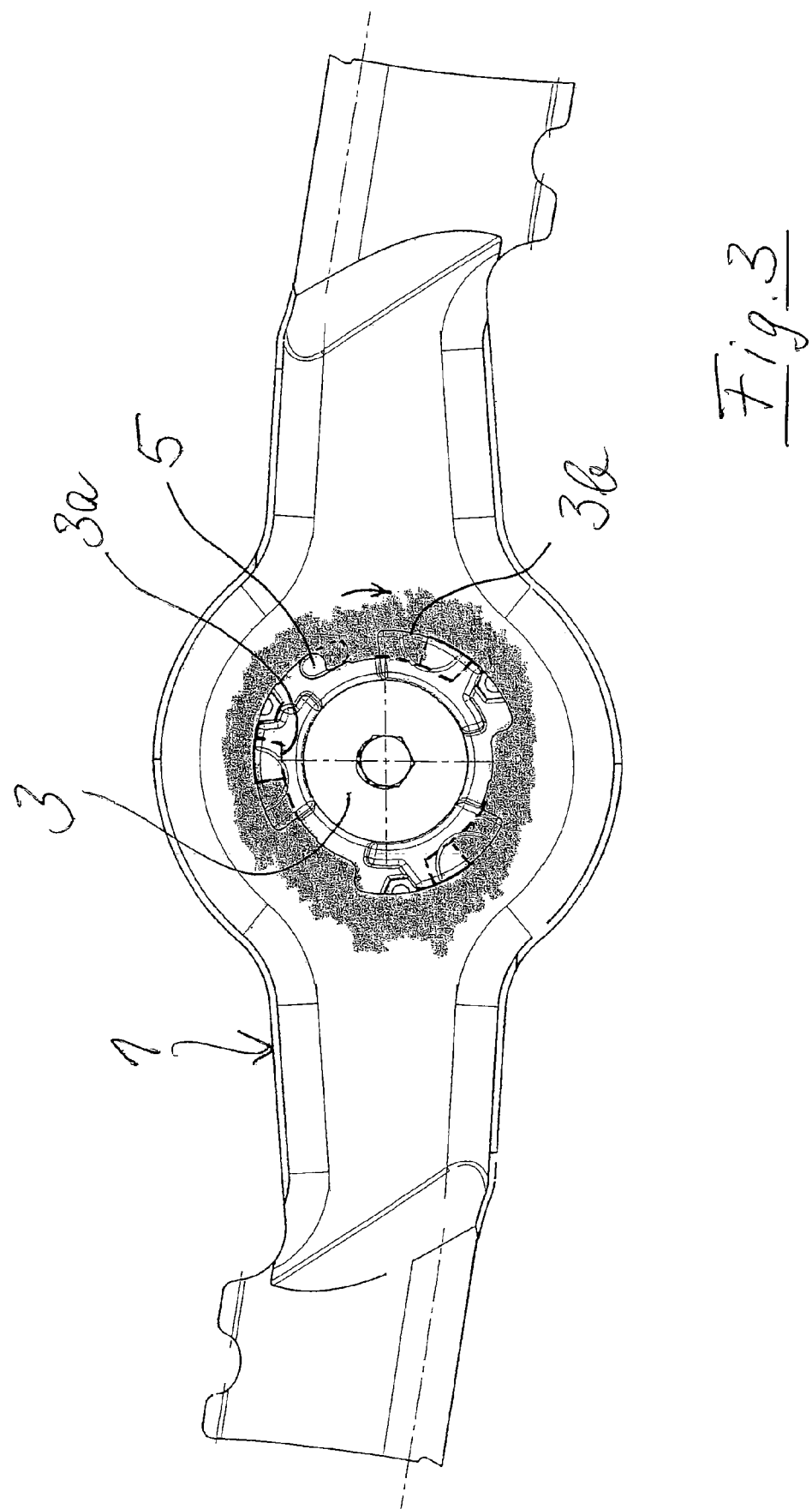
FIG. 3 is an axial bottom view of the knife according to FIG. 1, but in a semi-mounted state on the knife carrier.

The knife in the form of a knife bar 1, shown in FIGS. 1 and 2, has a known form with respect to its outer contour and its profiling. In particular, the knife bar has two diagonally opposite outer cutting edges 1a, which end in upwardly bent wings 1b on their rear ends in the peripheral direction. A bore 2 is located in the center of the knife bar. According to the invention, this bore has on its periphery several recesses 2a, 2b, 2c and projections 2d, 2e, 2f, which interact with the knife carrier (to be described below) in the manner of a bayonet lock. This interaction can be seen in the following figures.

FIG. 3 shows an intermediate stage in which the knife bar is partially mounted on its knife carrier 3. It can be seen there that the knife carrier 3 has an axially projecting cylindrical band 3a over parts of its periphery. This band 3a corresponds to the inner peripheral sections 2d, 2e, 2f of the bore 2 of the knife bar and defines its axis of rotation. Alternatively or additionally, the pivotal mounting can also be brought about by outer peripheral surfaces 3b of the knife carrier, which correspond to the peripheral edges of the recesses 2a, 2b, 2c of the knife bar.

Figure 7:
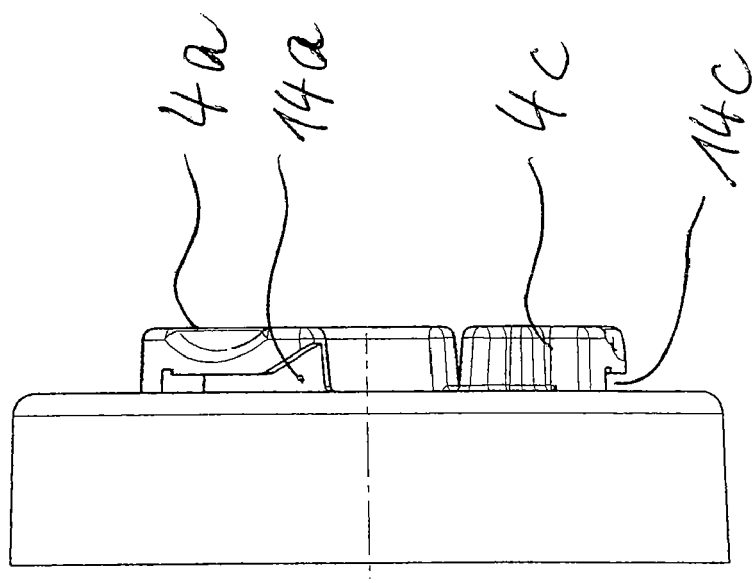
FIG. 7 is a side view of the knife carrier of FIG. 6.
Figure 6:
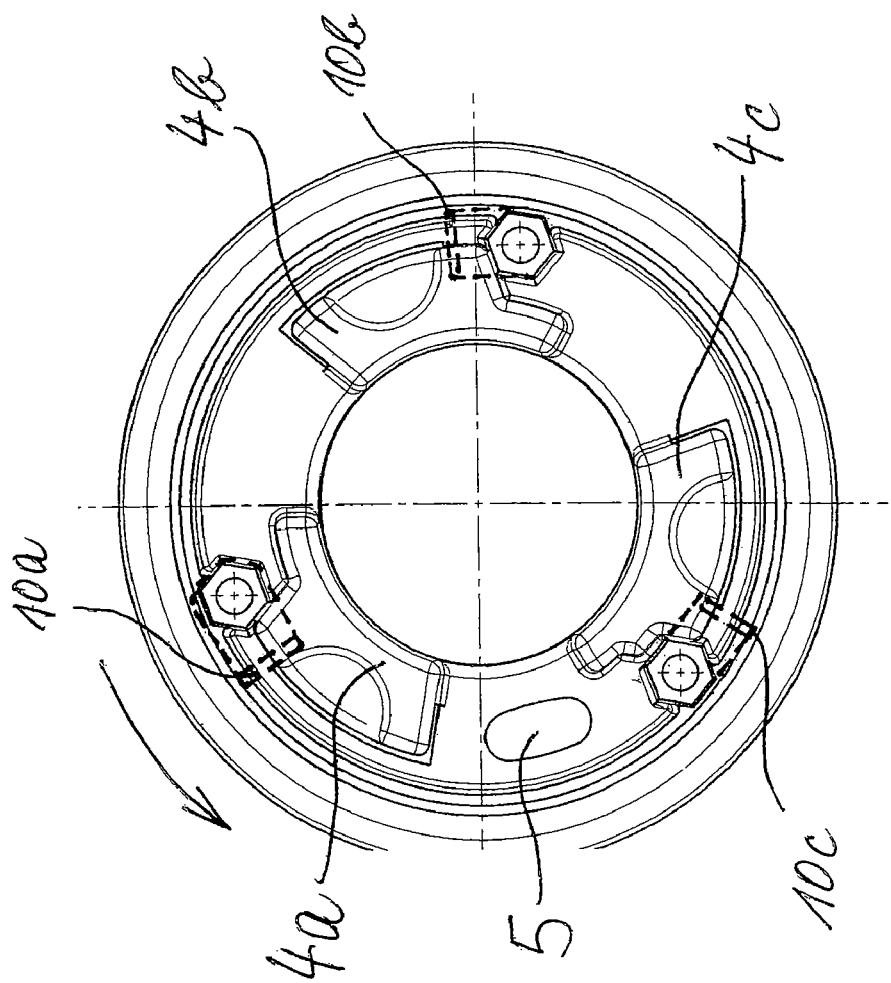
FIG. 6 is a view axial bottom view of the knife carrier.

For a better understanding, reference is now made to FIGS. 6 and 7, which show the knife carrier without the knife bar. The important point here is that the knife carrier has several axially protruding projections 4a, 4b and 4c, which project downwardly in the operating position and whose shape and position correspond to the recesses 2a, 2b, 2c of the knife bar, in such a way that the projections sink into the recesses of the knife bar, when the knife bar is placed on the knife carrier. In addition, it is also important that the projections 4a to 4c each have a slit extending in the peripheral direction in their base area; see FIG. 7, where the slits 14a and 14c are visible. These slits are open in the one peripheral direction, i.e. where an arrow is shown in FIG. 6, whereas they are closed on the other peripheral end.

Figure 4:
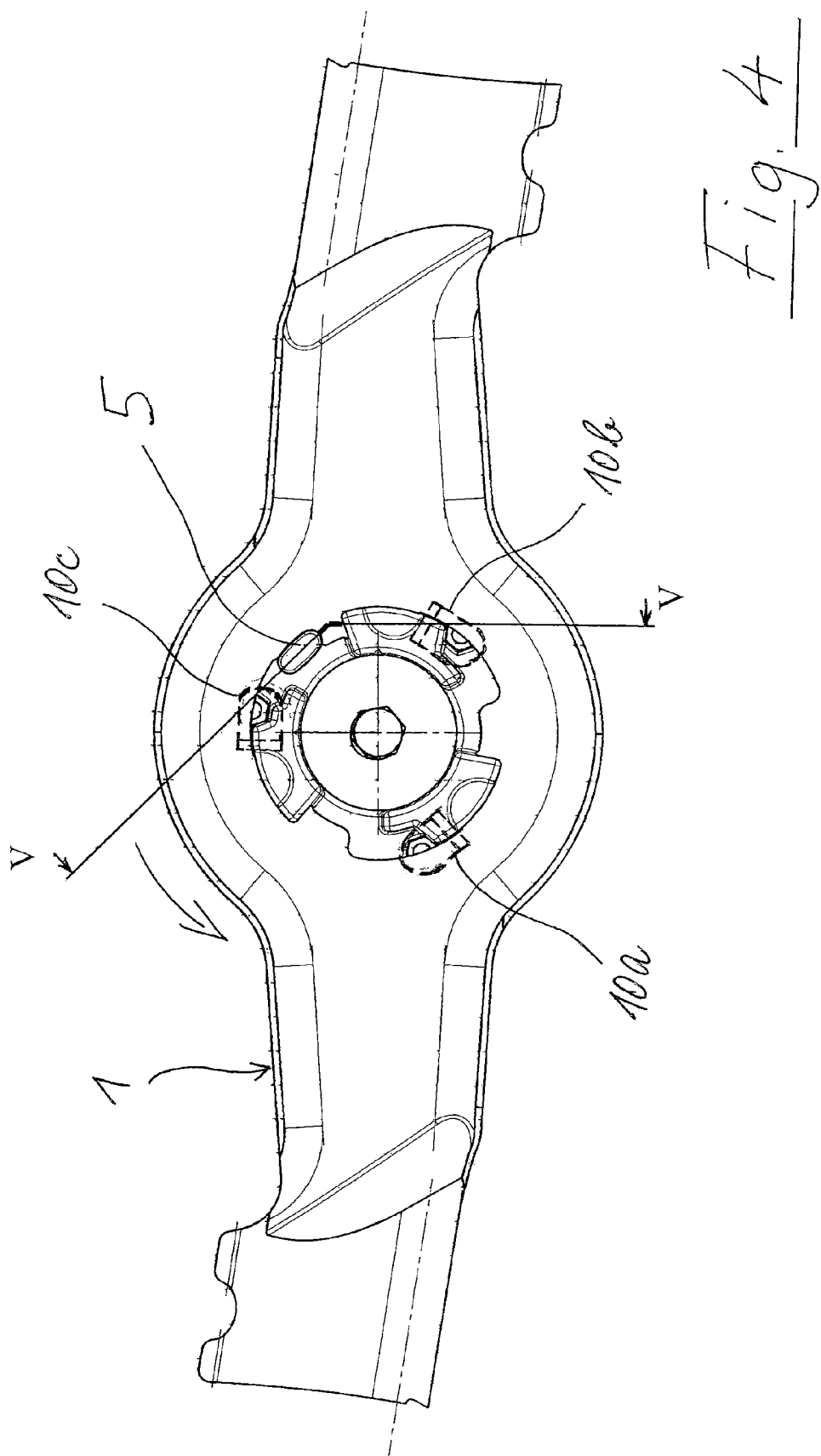
FIG. 4 is the same view as in FIG. 3, but in a completely mounted position.

The slits are positioned and formed in such a way that, when the knife bar is situated on the knife carrier 3, the peripheral areas 2d, 2e and 2f lying radially inside the recesses 2a, 2b, 2c penetrate into the slits 14a to 14c when the knife bar is turned. This partially inserted state of the inner peripheral areas of the knife bar into the slits of the knife carriers is shown in FIG. 3. The completely inserted state, in which the peripheral areas of the knife bar abut against the closed ends of the slits 14a to 14c, is shown in FIG. 4. The knife holder is thereby held by the slits 14a to 14c in a form-locking manner in the axial direction and substantially free from play. In this connection, also see the axial section in FIG. 5.

In the peripheral direction, the knife is at first only stopped in that direction in which the radial transitions between the inner and outer peripheral areas 2a to 2f of the knife bar abut against the closed ends of the slits 14a to 14c. To now prevent the knife bar from unscrewing from the slits, at least one axially movable locking element in the form of a push button 5 is arranged in the knife carrier. This push button projects downwardly out of the knife carrier by spring tension from the spring 6, and is positioned such that it is pressed by the surface of the knife into the knife carrier when the knife bar is placed on the knife carrier. When the knife is then turned, the covering of the push button by the knife is gradually offset. Thus, the push button in FIG. 3 is already half visible after the knife has been half screwed into the slits, whereas it is not at all covered any more by the knife after the knife has been completely screwed in. It then springs into its protruding position, so that it functions as a stop and prevents the knife from turning back out of the slits 14a to 14c.

The described stopping of the knife in both peripheral directions takes place in such a way that the knife bar is screwed into the slits 14a to 14c counter to the cutting direction of the knife. As a result, the driving torque (which is indicated by an arrow in each of FIGS. 4 and 6) is transmitted via the rigid projections 4a to 4c of the knife carrier, whereas the locking element (push button 5) remains almost free of forces.

To dismantle the knife bar, it is only necessary to press the push button 5 a few millimeters into the knife carrier, so that it no longer blocks the knife. The knife can then be unscrewed from the slits 4a to 4c in the cutting direction and readily removed.

The mounting of the knife bar is even easier, because it already presses the push button 5 into the knife carrier on its own when placed on the knife carrier.

Figure 8:
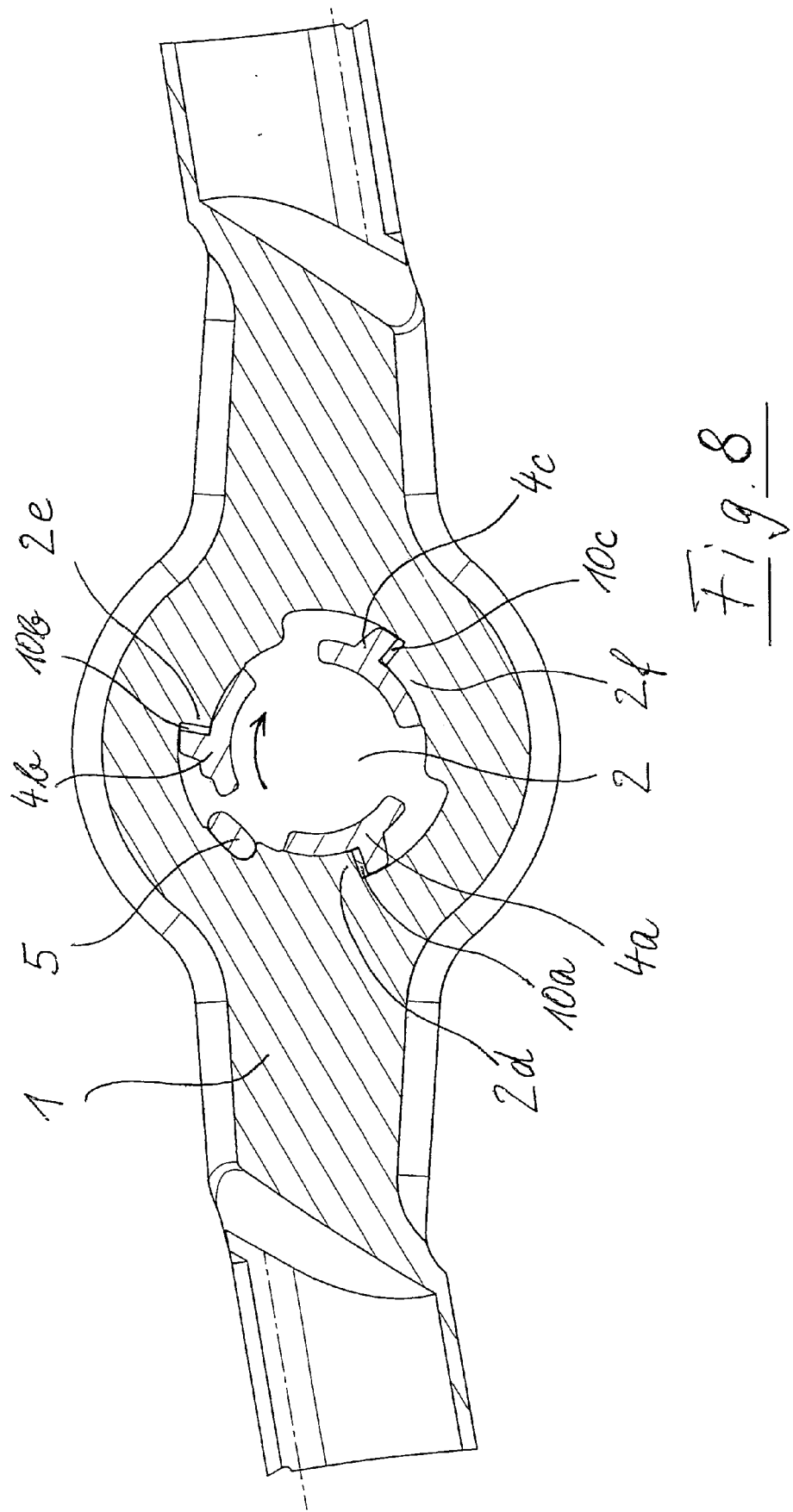
FIG. 8 is a radial sectional view through knife and knife carrier.
Figure 9:
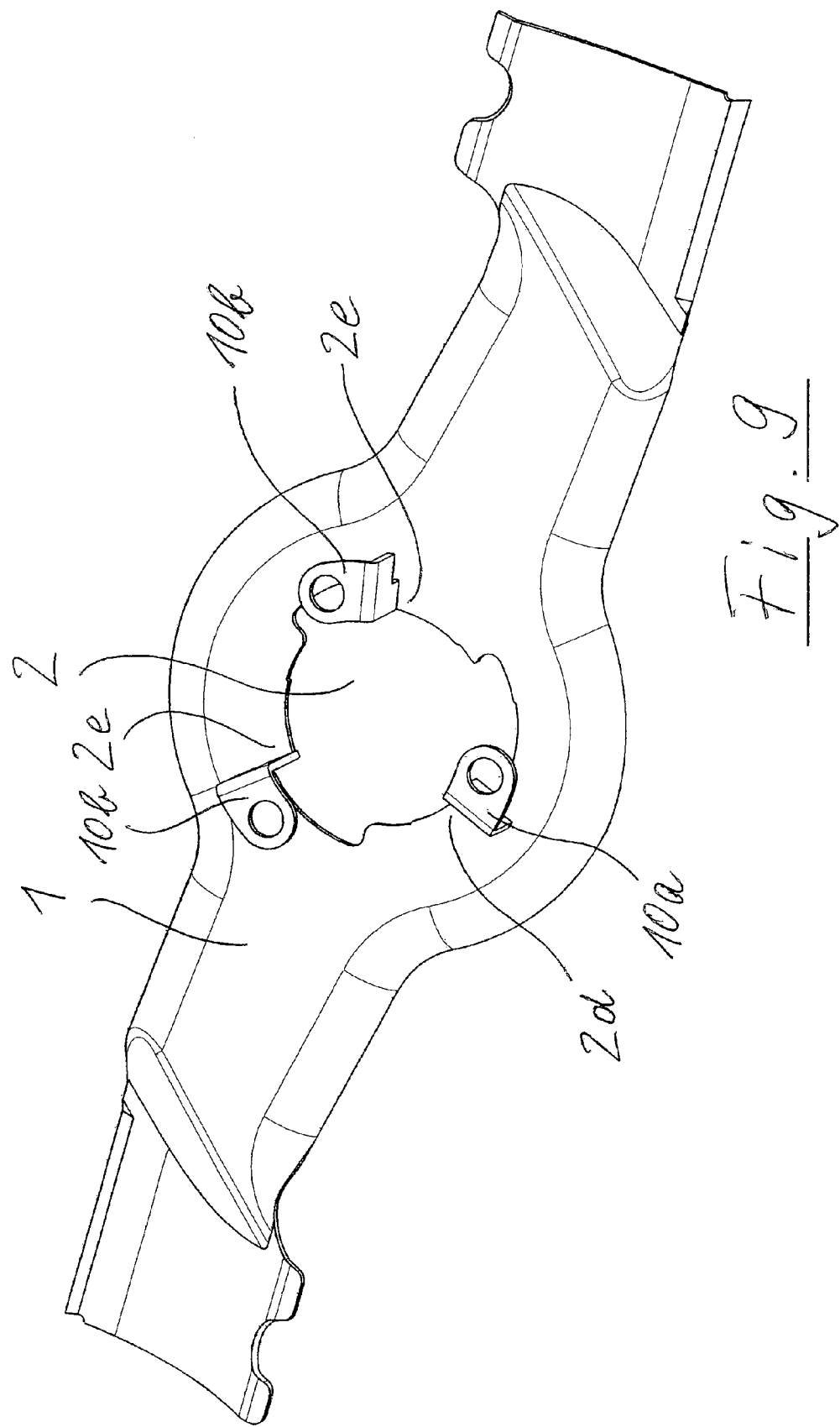
FIG. 9 is a top view of the knife with separate stop plates.

An important detail can also be seen in FIGS. 8 and 9 in association with FIG. 5. In FIG. 8, the horizontal section along the plane of the knives uncovers the three projections 4a, 4b and 4c of the knife carrier which transmit the driving torque from the knife carrier to the knife. Moreover, the locking element in the form of a push button 5 can be seen there, with the locking element preventing the knife from unscrewing from the bayonet lock when it is in its unpressed position. It is now essential that the projections 4a to 4c do not act directly on the inwardly protruding projections 2d, 2e and 2f along the knife bore 2, but that this action take place by insertion of stop plates 10a, 10b and 10c. These stop plates consist of a stable metal like the knife 1, for example iron, whereas the knife carrier 3 is preferably made of a light metal, for example aluminum. The stop plates, which are preferably separate parts, have the advantage that the hard knife cannot directly transmit the impact to the knife carrier when obstacles are hit.

Various possibilities are available for the structural design of the stop plates 10a to 10c. In the embodiment (see FIG. 9), the stop plates are configured as right angles, which assume the impact function between the knife and the knife carrier, with their axially and radially extending leg visible in FIG. 8, while their leg bent by 90° is mounted on the knife carrier, in particular (see FIG. 5) by a pin 3a, such that this leg is caught between two halves of the knife head.

In order that the bayonet lock according to the invention not be clogged by cut material, whirled up soil and the like, a circumferentially extending sealing ring 7 (see FIG. 5) is provided between the knife carrier and the knife bar. A sealing ring 8 between the push button 5 and the knife carrier serves the same purpose. Optionally, a seal in the area of the slits 14a to 14c is also useful.

Finally, it is within the scope of the invention to furnish the knife carrier with spring elements, which act on the knife bar in the axial direction and thus ensure an absolutely play-free mounting in the slits 14a to 14c.

The invention was described above with reference to a one-piece knife bar. Of course, a multipart knife construction is also within the scope of the invention. For example, the central area of the knife bar, with the bore 2 and the recesses and projections arranged on the periphery of the bore, can be formed by an annular disk, on which separate, radially protruding knives are then fastened.

It is also within the scope of the invention to use the bayonet lock not only in lawn mowers, but also in comparable cutting and comminuting devices, if a quick and easy knife exchange is important in these cases.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A cutting device comprising at least one rotating knife (1) mounted on a rotating, motor-driven knife carrier (3) by a screwless, detachable connection, the connection being detachable by a relative rotation between the knife (1) and the knife carrier (3), wherein the connection between the at least one knife (1) and the knife carrier (3) comprises a centrally arranged bayonet lock (2a to 2f; 14a to 14c), wherein the bayonet lock is stopped in a closed position by at least one additional, adjustable locking element (5), wherein the knife has an opening (2) with radial recesses (2a to 2c) and/or radial projections (2d to 2f) in its center, at least one recess and/or projection of which interacts with the locking element (5), wherein in a first position the locking element (5) blocks the relative rotation between the knife (1) and the knife carrier (3) in a positive manner, but in a second position releases the relative rotation, and wherein the locking element (5) has a form of a push button that is spring-mounted in the knife carrier, the push button releasing the relative rotation between the knife and the knife carrier (3) in a position pushed in against the spring tension.

2. The cutting device according to claim 1, wherein the relative rotation between the knife (1) and the knife carrier (3) takes place in a cutting direction of the knife to release the knife.

3. The cutting device according to claim 1, wherein the knife (1) has a form of a knife bar which interacts in its center with the bayonet lock (2a to 2f; 14a to 14c).

4. The cutting device according to claim 1, wherein the locking element (5) has a seal (8) against the knife carrier (3).

5. The cutting device according to claim 1, wherein a seal (7) is arranged between the knife (1) and the knife carrier (3).

6. The cutting device according to claim 1, wherein stop plates (10a, 10b, 10c) acting in a peripheral direction of the rotating knife are arranged between the knife (1) and the knife carrier (3).

7. The cutting device according to claim 1, which comprises a lawn mower.

* * * * *